United States Patent
Kita et al.

(10) Patent No.: US 7,604,786 B2
(45) Date of Patent: Oct. 20, 2009

(54) METHOD FOR RECOVERING INDIUM FROM INDIUM-CONTAINING MATERIAL

(75) Inventors: Nobuaki Kita, Tokyo (JP); Yuzuru Nakamura, Tokyo (JP); Akira Tsukada, Tokyo (JP)

(73) Assignee: Dowa Metals & Mining Co., Ltd., Tokyo (JP)

( * ) Notice: Subject to any disclaimer, the term of this patent is extended or adjusted under 35 U.S.C. 154(b) by 12 days.

(21) Appl. No.: 11/902,759

(22) Filed: Sep. 25, 2007

(65) Prior Publication Data
US 2008/0081009 A1 Apr. 3, 2008

(30) Foreign Application Priority Data
Sep. 28, 2006 (JP) .............................. 2006-266118

(51) Int. Cl.
*C01F 7/48* (2006.01)
(52) U.S. Cl. ..................................................... 423/126
(58) Field of Classification Search ................. 423/132, 423/111; 75/364, 365
See application file for complete search history.

(56) References Cited

U.S. PATENT DOCUMENTS 7,166,143 B2 * 1/2007 Geixman et al. .............. 75/364

FOREIGN PATENT DOCUMENTS

| GB | 1 519 284 A | 7/1978 |
|---|---|---|
| JP | A-5-156381 | 6/1993 |
| JP | A-11-269570 | 10/1999 |
| JP | A-2001-348632 | 12/2001 |

OTHER PUBLICATIONS

M.A. Barakat, "Recovery of lead, tin and indium from alloy wire scrap," Hydrometallurgy, Jun. 1998, 63-73, vol. 49, No. 1-2.
P. Halsall, "Indium-extraction from lead, zinc and tin circuits," Trans Inst Min Metall, Jun. 1988, vol. 97, C93-C101.

* cited by examiner

*Primary Examiner*—Melvin C Mayes
*Assistant Examiner*—Melissa Stalder
(74) *Attorney, Agent, or Firm*—Oliff & Berridge, PLC

(57) ABSTRACT

The present invention provides a recovery method in which the indium sponge that is deposited by substitution in the substitution deposition step in the recovery of indium from an indium-containing material is produced in the form of a powder rather than in a bulky form. This recovery method is a method in which an indium sponge is deposited by substitution by adding a substance containing chlorine, and further adding a reducing agent, to an indium-containing solution whose pH has been adjusted to a value in the range of 1 to 2.2.

6 Claims, 1 Drawing Sheet

METHOD FOR RECOVERING INDIUM FROM INDIUM-CONTAINING MATERIAL

BACKGROUND OF THE INVENTION

1. Field of the Invention

The present invention relates to a method for recovering indium from an indium-containing material.

2. Description of the Related Art

As a conductive compound of the III-V group, indium is utilized in intermetallic compounds such as InP, InAs, and the like, in indium oxide doped with tin (ITO) as a material for use in solar cells, and in transparent conductive thin films. It is expected that the demand for indium will become increasingly greater in the future.

Conventionally, there has been no principal ore for indium; industrially, indium has been produced by recovering indium as a by-product in zinc purification or lead purification, e.g., by recovering indium concentrated in soot and smoke. Accordingly, raw materials used for the recovery of indium contain large amounts of metal impurities such as Zn, Fe, Cu, Al, Ga, As, Cd, and the like. Furthermore, many types of components other than these metal components are also contained in trace amounts.

Accordingly, a complicated process is required in order to remove these metal impurities and recover high-purity indium. Generally, the abovementioned indium recovery process is accomplished by a combination of electrolytic purification methods and chemical purification such as (A) methods in which indium is precipitated as a hydroxide by adjusting the pH, (B) methods in which indium is precipitated as a sulfide by adding a sulfurizing agent, (C) methods in which indium is substituted and deposited by adding metals such as Al, Zn, Cd, Zn—Cd alloys, and the like, (D) methods in which indium is recovered by solvent extraction, (E) methods in which indium is recovered by an ion exchange method, and the like.

However, in the abovementioned recovery processes, methods according to (A) are methods which utilize differences in the pH regions where metal ions produce hydroxides. For example, a method in which Zn and Al are dissolved and In is precipitated and recovered as a hydroxide by raising the pH to 12 or greater is used as a method for separating In from Zn and Al. In this method, however, the In hydroxide that is produced has extremely poor filtration characteristics; accordingly, the size of the filtration equipment is increased, and the operation also requires a long time. In this method, it is also difficult to separate In from impurities such as Fe, Cu, As, Cd, and the like.

The methods of (B) utilize differences in the solubility product of metal sulfides: in such methods, low-purity sulfides containing various metal impurities such as those described above are produced in large quantities. These sulfides generally have poor filtration characteristics; furthermore, in cases where the In sulfide obtained is extracted, it is difficult to extract the In completely using sulfuric acid alone. Accordingly, such methods suffer from the problem of being difficult to apply to wet zinc processes.

A problem is involved in (C) such that in cases where impurities that are nobler than In are contained, separation of In from these metals is impossible.

A problem is involved in (D) and (E) such that a burden is placed on the pre-processing by the impurities that are separated from In; furthermore, the running cost is high.

In all of the chemical purification methods described above, the separation of impurity metals is inadequate. Accordingly, neither can a simple electrowinning method (in which the object metal is extracted into an aqueous solution, electrolysis is performed using an insoluble anode, and a high-purity metal is obtained in a single process at the cathode) be used as a combination electrolytic purification method, and it has been unavoidably necessary to use a cumbersome electrolytic purification method (in which crude metal is used as the anode, and purification is performed by electrolysis of the high-purity metal at the cathode).

Accordingly, each of the methods described above has a respective problem. Combinations of the abovementioned methods are used for actual recovery, and the process used in order to recover high-purity In become complicated and bothersome; this has not been an economical method.

In Patent Document 1, the present inventors proposed a method for recovering indium from an indium-containing material including an acid extraction step in which the indium-containing material is subjected to extraction processing with an acid, and metals that are soluble in the acid are dissolved together with In; a step of removing Cu and the like in which a sulfurizing agent is added to the extract obtained in the abovementioned acid extraction step while adjusting the oxidation-reduction potential, and metals other than In such as Cu and the like are removed by precipitation; a sulfurizing and precipitation step in which sulfuric acid and a sulfurizing agent are added to the aqueous solution of indium obtained in the abovementioned step of removing Cu and the like, and In is precipitated and concentrated as a sulfide; an $SO_2$ extraction step in which In is selectively extracted by blowing $SO_2$ gas into the indium sulfide obtained in the abovementioned sulfurizing and precipitation step in the presence of sulfuric acid acidity; a substitution deposition step in which the pH and solute $SO_2$ concentration of the indium-containing extract obtained in the above-mentioned $SO_2$ extraction step is adjusted, a metal powder is then added, and an indium sponge is deposited by substitution; a hydrochloric acid extraction step in which the indium sponge obtained in the abovementioned substitution deposition step is extracted with hydrochloric acid; a step of removing Cd and the like in which a sulfurizing agent is added to the indium extract obtained in the abovementioned hydrochloric acid extraction step, residual metal ions of Cd and the like are removed by precipitation, and a starting electrolytic solution is obtained; and an electrowinning step in which the starting electrolytic solution obtained in the abovementioned step of removing Cd and the like is electrolyzed, and high-purity metallic indium is obtained.

[Patent Document 1] Japanese Laid-Open Patent Application No. 11-269570.

SUMMARY OF THE INVENTION

The steps of recovering indium from an indium-containing material have been simplified by the method described in Patent Document 1, and this method has contributed to a reduction in the production cost. However, using the method described in Patent Document 1 may involve the problem such that the indium sponge that is deposited by substitution in the substitution deposition step is produced as a bulky form. When a bulky indium sponge is produced, the hydrochloric acid extraction cannot be performed unmodified in the hydrochloric acid extraction step. Accordingly, a step in which this bulky indium sponge is pulverized is newly required, and this pulverization step has been the cause of an increase in the production cost.

The present invention was devised in light of the abovementioned conditions; it is an object of the present invention to provide a method for recovering indium from an indium-containing material in which the indium sponge deposited by substitution in the substitution deposition step is produced not in bulk form, but rather in powder form.

MEANS USED TO SOLVE THE PROBLEMS

The present inventors conducted diligent research in order to solve the abovementioned problem. As a result of trial and error, the inventors discovered that the conversion of the indium sponge into a bulky form can be suppressed by performing a step of adding a substance containing chlorine to the indium-containing solution whose pH has been adjusted to a value in the range of 1 to 2.2 in the above-mentioned substitution deposition step, and a step of adding a reducing agent to the indium-containing solution to which the abovementioned substance containing chlorine has been added, and depositing an indium sponge by substitution. The inventors perfected the present invention as a result of this discovery.

Specifically, in order to solve the aforementioned problem, a first aspect provides a method for recovering indium from an indium-containing material, wherein this method has a step of adding a substance containing chlorine to an indium-containing solution whose pH has been adjusted to a value in the range of 1 to 2.2, and a step of adding a reducing agent to the indium-containing solution to which the abovementioned substance containing chlorine has been added, and depositing an indium sponge by substitution.

A second aspect of the present invention provides the method for recovering indium from an indium-containing material according to the first aspect, wherein the value of the molar ratio of Cl/In is set at a value that is greater than 0 but no greater than 0.68 in the abovementioned step in which a substance containing chlorine is added.

A third aspect of the present invention provides the method for recovering indium from an indium-containing material according to the first or second aspect, wherein one or more substances selected from the group consisting of sodium chloride and an electrolytic tailing solution of indium is used as the abovementioned substance containing chlorine.

A fourth aspect provides the method for recovering indium from an indium-containing material according to any of the first through third aspects, wherein metallic zinc is used as the abovementioned reducing agent.

EFFECT OF THE INVENTION

In these aspects of the present invention, the indium sponge deposited by substitution in the substitution deposition step is produced as powder, and the productivity of the recovery of indium from an indium-containing material is improved.

DESCRIPTION OF THE PREFERRED EMBODIMENTS

Figure 1:
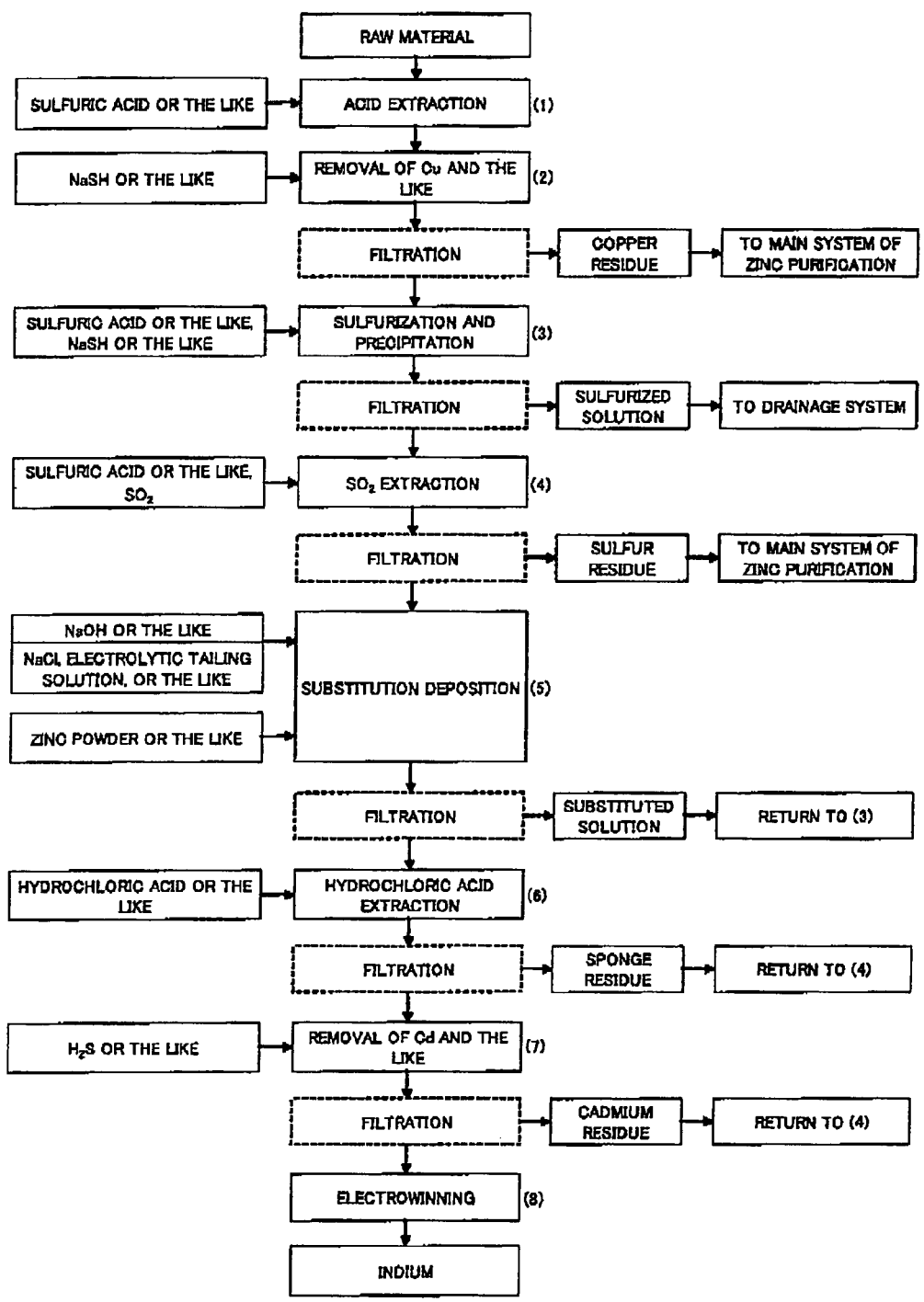
FIG. 1 is a process diagram showing an outline of the method of the present invention.

In the present invention, substances containing indium can be widely used as starting raw materials; here, however, a case in which the present invention is applied to neutral gypsum which is produced as a by-product in wet zinc purification will be described as an example. An example of the indium recovery process by this method is shown in FIG. 1.

In step (1), when neutral gypsum is extracted using sulfuric acid, impurity metal ions such as Cu, As, Al, Fe, Zn, Ga, and the like that are soluble in acids are extracted together with In, and a slurry with insoluble gypsum is formed. Besides sulfuric acid, it would also be possible to use hydrochloric acid, nitric acid, or the like as the acid used in this extraction. The present invention is not limited to sulfuric acid; however, sulfuric acid is the least expensive. The sulfuric acid concentration of the In extract is ordinarily 20 to 40 g/l.

In step (2), for example, $H_2S$ or NaSH is added as a sulfurizing agent to the In extract slurry obtained in step (1) while the oxidation-reduction potential (hereafter referred to as "Eh") is controlled so that this potential is in the range of 50 to 320 mV (using an Ag/AgCl electrode), and impurities such as Cu, As, and the like are precipitated and removed as sulfides. In this case, since the sulfuric acid concentration is also controlled to 20 to 40 g/l, In is not precipitated.

90% or more of the In contained in the neutral gypsum is transferred into the acidic solution of sulfuric acid by the processing in steps (1) and (2). Accordingly, for example, the precipitate (copper residue) is subjected to a solid-liquid separation using a filter press or the like, In this case, the insoluble gypsum acts as a filtration assistant during extraction; accordingly, the generally poor filtration characteristics of sulfides are greatly improved. The copper residue is sent back into the main system of zinc purification.

In step (3), a sulfurizing agent, e.g., $H_2S$ or NaSH is added simultaneously with sulfuric acid to the aqueous solution containing In obtained in step (2), and In is precipitated as a sulfide. This is subjected to a solid-liquid separation using a filter press or the like, and impurities such as Zn, Fe, Al, Ga, and the like remaining in the solution are separated and removed. The recovery rate of In in the precipitate is 95% or greater. The filtrate (sulfurized solution) is sent to the drainage system.

In step (4), In is extracted while $SO_2$ gas is blown into the indium sulfide obtained in step (3) under sulfuric acid acidity.

Acid extraction methods for sulfides generally include three types, i.e., (a) the hydrogen sulfide generating type, (b) the sulfur producing type, and (c) the sulfuric acid producing type. However, in cases where indium sulfide is extracted, the solubility product in the reaction operating arm (a) is small, and therefore In cannot be completely extracted using this method. In cases where oxygen is used as an oxidizing agent in the reactions of (b) and (c), the reaction temperature and pressure must be respectively set at high values, i.e., 150° C. and 12 $kg/cm^2$; accordingly, a pressure vessel such as an autoclave or the like must be used as the reaction vessel. Furthermore, although In can be completely extracted in these methods, the oxidizing power is strong, so that impurities that are contained are also similarly completely extracted.

In the method of the present invention, a combination of the reactions of (a) and (b) is performed by using $SO_2$ as an oxidizing agent, the oxidizing power is appropriately controlled, and the extraction of other impurities is suppressed while In is extracted; i.e., In is selectively extracted. The temperature in this case may be ordinary temperature, and the pressure may also be atmospheric pressure. Accordingly, an ordinary reaction vessel can be used. After the reaction, 90% or more of the In is transferred into the extract; accordingly, a solid-liquid separation is performed using a filter press or the like. The cake (sulfur residue) is sent to the main system of zinc purification.

In step (5), the In extract obtained in step (4) is neutralized with an alkali, e.g., caustic soda or the like, and the pH is preferably adjusted to a value in the range of 1 to 2.2. The associated rationale is that if the pH is 1 or greater, the amount of zinc powder that is added as a substitution agent in a later step can be suppressed, and if the pH is 2.2 or less, the bulk formation of the In sponge deposited in a later step can be suppressed. Following the adjustment of the pH, a substance containing chlorine (e.g., a chlorine compound that is a salt of sodium, or an electrolytic tailing solution of indium) is added, and the value of the molar ratio of Cl/In in the In extraction is adjusted to a value of 0 to 1.44, preferably 0.68 or less. Next, a powder of a metal which has a greater tendency toward ionization than indium, e.g., a zinc powder, is added, and a powder-form indium sponge is deposited by substitution It is desirable that the oxidation-reduction potential be −200 mV or less.

Since $SO_2$ is used in the extraction in step (4), $SO_2$ is dissolved in the In extraction that is supplied to step (5). Accordingly, the bulky indium sponge can be prevented from forming, and a powder-form indium sponge can be obtained, by blowing air in, and controlling the $SO_2$ concentration in the In extract to a value of 0.05 to 0.3 g/l. The substituted solution is returned to the abovementioned step (3).

In step (6), the powder-form indium sponge obtained in step (5) is extracted using hydrochloric acid, with the pH controlled to a value in the range of 0.5 to 1.5 and the Eh controlled to a value in the range of −400 to −500 mV. In this case, 90% or more of the In is transferred into the extract; accordingly, a solid-liquid separation is performed using a filter press or the like. Trace metals such as Cd, Pb, Ni, As, and the like can be concentrated and removed in the extraction residue (sponge residue). The sponge residue is returned to the abovementioned step (4).

In step (7), in cases where Cd, As, and the like still remain in the In extract obtained in step (6), a sulfurizing agent, e.g., $H_2S$ gas, is blown in, a final cleaning is performed, a solid-liquid separation is performed, and the filtrate is used as a starting electrolytic solution. The cake (cadmium residue) is returned to the abovementioned step (4).

In step (8), electrowinning is performed using a DSA (dimensionally suitable anode) as the anode, and a Ti plate as the cathode, from the starting electrolytic solution obtained in step (7), and high-parity metallic indium is obtained.

EXAMPLES

The recovery processing of indium was performed using neutral gypsum produced as a by-product in a wet zinc purification process as the starting raw material. (1) Acid extraction: Water was added to 294.5 g of neutral gypsum which was the raw material for In recovery, to form a pulp having a solid concentration of 203 g/l. While mechanical agitation was performed using an agitator, sulfuric acid was added to this so that the final acid concentration was 28 g/l, and an extraction was performed for 2 hours while the temperature was maintained at 60° C. The contents and distributions of In, Zn, Cu, and As in the raw material and the extract obtained are shown in Table 1.

TABLE 1

Material balance of acid extraction step

|  | Amount | Content (%, g/l) | | | | Distribution (%) | | | |
| --- | --- | --- | --- | --- | --- | --- | --- | --- | --- |
|  | (g, ml) | In | Zn | Cu | As | In | Zn | Cu | As |
| Raw material | 294.5 | 1.54 | 13.1 | 3.49 | 1.28 | 100.0 | 100.0 | 100.0 | 100.0 |
| Extract | 1450 | 3.03 | 25.8 | 6.86 | 2.47 | 96.7 | 97.1 | 96.8 | 94.9 |

In Table 1, the raw material amounts are shown in g, and the amounts in the extract are shown in ml.

(2) Removal of Cu and the like: NaSH was added to the extract slurry obtained in the abovementioned extraction step, and a sulfurizing reaction was performed until Eh reached 300 mV (using an Ag/AgCl electrode). The reaction time was 2 hours, and the reaction temperature was 60° C. Following the completion of the reaction, the slurry obtained was filtered; the cake was used as a copper residue, and the filtrate was used as a copper-free solution. The respective analysis results are shown in Table 2.

TABLE 2

Material balance of step of removing Cu and the like

|  | Amount | Content (%, g/l) | | | | Distribution (%) | | | |
| --- | --- | --- | --- | --- | --- | --- | --- | --- | --- |
|  | (g, ml) | In | Zn | Cu | As | In | Zn | Cu | As |
| Extract slurry | 1500 | 3.20 | 27.4 | 7.26 | 2.61 | 100.0 | 100.0 | 100.0 | 100.0 |
| Copper residue | 107.1 | 0.13 | 0.30 | 10.2 | 1.70 | 2.9 | 0.8 | 100.3 | 46.5 |
| Copper-free solution | 1450 | 3.21 | 28.1 | tr | 1.44 | 97.1 | 99.2 | 0.0 | 53.5 |

In Table 2, the amounts in the extract slurry and the amounts in the copper-free solution are shown in ml, and the amounts in the copper residue are shown in g.

(3) Sulfurizing and precipitation: While the abovementioned copper-free solution (aqueous solution containing In) was agitated with an agitator, the pH was maintained at a constant level of 0.8 with sulfuric acid; NaSH was added until Eh reached −20 mV (using an Ag/AgCl electrode), and In was precipitated as a sulfide. The reaction was performed for 5 hours at a temperature of 60° C. Following the completion of the reaction, the slurry obtained was filtered; the cake was used as a sulfurization residue, and the filtrate was used as a sulfurized solution. The respective analysis results and material balances are shown in Table 3.

TABLE 3

Material balance of sulfurization precipitation step

| | Amount | Content (%, g/l) | | | | Distribution (%) | | |
|---|---|---|---|---|---|---|---|---|
| | (g, ml) | In | Zn | Cu | As | In | Zn | As |
| Copper-free solution | 1450 | 3.21 | 28.1 | tr | 1.44 | 100.0 | 100.0 | 100.0 |
| Sulfurized solution | 1430 | 0.02 | 24.6 | 0.0 | tr | 0.6 | 86.3 | 0.0 |
| Sulfurization residue | 45.7 | 9.96 | 22.8 | 0.0 | 4.55 | 97.8 | 25.6 | 99.6 |

In Table 3, the amounts in the copper-free solution and the amounts in the sulfurized solution are in ml, and the amounts in the sulfurization residue are in g.

(4) $SO_2$ extraction: The sulfurization residues obtained by repeating the abovementioned steps (1) through (3) were collected to produce 417.7 g; water was added to this to form pulp with a solid concentration of 119 q/l. While this was agitated with an agitator, sulfuric acid was added so that the sulfuric acid concentration was adjusted to 51 g/l, and $SO_2$ gas was blown in so that the solute $SO_2$ concentration was 8 g/l. The reaction was performed for 2 hours at a temperature of 80° C. Following the completion of the reaction, the slurry obtained was filtered, the cake was used as a sulfur residue, and the filtrate was used as an $SO_2$ extract. The respective analysis results and material balances are shown in Table 4.

TABLE 4

Material balance of $SO_2$ extraction step

| | Amount | Content (%, g/l) | | | | Distribution (%) | | |
|---|---|---|---|---|---|---|---|---|
| | (g, ml) | In | Zn | Cu | As | In | Zn | As |
| Sulfurization residue | 417.7 | 13.41 | 19.1 | 0.0 | 10.32 | 100.0 | 100.0 | 100.0 |
| Sulfur residue | 236.0 | 0.78 | 3.75 | 0.0 | 17.50 | 3.3 | 11.1 | 95.8 |
| $SO_2$ extract | 3450 | 18.0 | 30.7 | 0.0 | 0.20 | 110.9 | 132.6 | 1.6 |

In Table 4, the amounts in the sulfurization residue and the amounts in the sulfur residue are in g, and the amounts in the $SO_2$ extract are in ml.

(5) Substitution deposition: Air was blown into the abovementioned $SO_2$ extract, and degassing was performed until the solute $SO_2$ concentration was 0.2 g/l. NaOH was added, and the extract was neutralized until the pH reached 2.2. This was used as a substitution raw-material solution. 3000 ml of this substitution raw-material solution was taken as one sample, and three samples (samples 1 through 3) were thus prepared. In sample 1 thus prepared, sodium chloride was added, and the value of Cl/In molar ratio was adjusted to 0.68 or less. In sample 2, sodium chloride was added, and the value of Cl/In molar ratio was adjusted to 0.68 to 1.44, In sample 3, sodium chloride was added, and the value of Cl/In molar ratio was adjusted to 1.44 or greater.

1.8 equivalents of zinc powder with respect to the In was added to the 3000 ml of each of the substitution raw-material solution in the prepared samples 1 through 3, and an In sponge was deposited by substitution. The reaction temperature was 60° C., and the reaction time was 1 hour. The probability of bulky sponge generation in each sample is shown in Table 5, and the analysis results and material balance for each product are shown in Table 6.

TABLE 5

Probability of generation of bulky sponge in substitution process

| Sample | Cl/In molar ratio | Batch No. (times) | No. of times bulky form occurred (times) | Probability of occurrence of bulky form (%) |
|---|---|---|---|---|
| Sample 1 | ≦0.68 | 73 | 0 | 0 |
| Sample 2 | 0.68 to 1.44 | 47 | 14 | 30 |
| Sample 3 | ≧1.44 | 9 | 9 | 100 |

TABLE 6

Material balance of substitution deposition step

| | Amount | Content (%, g/l) | | | | Distribution (%) | | |
|---|---|---|---|---|---|---|---|---|
| | (g, ml) | In | Zn | Cu | As | In | Zn | As |
| Starting substitution solution | 3000 | 18.0 | 30.7 | tr | 0.20 | 100.0 | 100.0 | 100.0 |
| Substituted solution | 2900 | 0.10 | 55.3 | 0.00 | tr | 0.5 | 174.1 | 0.0 |
| In sponge | 62.1 | 87.0 | 3.50 | 0.0 | 0.92 | 100.0 | 2.4 | 95.2 |

In Table 6, the amounts in the substitution raw-material solution and the amounts in the substituted solution are in ml, and the amounts in the In sponge are in g.

(6) Hydrochloric acid extracting: Water was added to 238.1 g of the In sponge collected by repeating the various steps described above, thus forming a pulp having a solid concentration of 144 g/l. While this was agitated with an agitator, hydrochloric acid was added so that the pH was adjusted to 1, and Eh to −480 mV (using an Ag/AgCl electrode), and indium was extracted. The reaction temperature was 65° C., and the reaction time was 3 hours. The analysis results and material balances of the respective products are shown in Table 7.

TABLE 7

Material balance of hydrochloric acid extraction step

| | Amount | Content (%, ppm, g/l, mg/l) | | | | | Distribution (%) | | | | |
|---|---|---|---|---|---|---|---|---|---|---|---|
| | (g, ml) | In | Ni | Cd | Pb | As | In | Ni | Cd | Pb | As |
| In sponge | 238.1 | 87.9 | 122 | 4400 | 4400 | 1780 | 100 | 100 | 100 | 100 | 100 |
| Sponge residue | 47.1 | 46.52 | 6 | 220 | 222 | 90 | 10.5 | 95.4 | 98.8 | 100.0 | 99.5 |
| Hydrochloric acid extract | 1500 | 130.6 | 0.9 | 8.7 | 0.2 | 0.2 | 93.6 | 4.9 | 1.3 | 0.0 | 0.1 |

In Table 7, the amounts in the In sponge and the amounts In sponge residue are in g, the amounts in the hydrochloric acid extract are in ml, the In contents are in % and g/l, and the contents of components other than In are in ppm and mg/i.

(7) Step of removing Cd and the like: NaOH was added to 1500 ml of the hydrochloric acid extract obtained in the abovementioned hydrochloric acid extraction step, and the extract was neutralized to a pH of 1.5. 1.5 l of $H_2S$ gas was blown into this solution, and impurities such as Cd and the like were precipitated as sulfides. The reaction temperature was 40° C., and the reaction time was 0.5 hours. The suspension following the reaction was filtered, the cake was used as a cadmium residue, and the filtrate was used as a cadmium-free solution. The analysis results and material balances of the respective products are shown in Table 8.

TABLE 8

Material balance of step of removal of Cd and the like

| | Amount | Content (%, ppm, g/l, mg/l) | | | | | Distribution (%) | | | | |
|---|---|---|---|---|---|---|---|---|---|---|---|
| | (g, ml) | In | Ni | Cd | Pb | As | In | Ni | Cd | Pb | As |
| Hydrochloric acid extract | 1500 | 130.6 | 0.9 | 8.7 | 0.2 | 0.2 | 100 | 100 | 100 | 100 | 100 |
| Cadmium residue | 2.6 | 50.35 | 0.0 | 2.7 | 0.1 | 0.0 | 0.7 | 0.0 | 98.9 | 100.0 | 0.0 |
| Cd-free solution | 1500 | 129.5 | 1.2 | 0.1 | 0.0 | 0.2 | 99.2 | 133.3 | 1.1 | 0.0 | 100.0 |

In Table 8, the amounts in the hydrochloric acid and the amounts in the Cd-free solution are in ml, the amounts in the Cd residue are in g, the In contents are in % in g/l, and the contents of components other than In are in ppm and mg/l.

(8) Electrowinning step: The Cd-free solution obtained in the abovementioned step (7) was used as a starting electrolytic solution, and electrowinning was performed for 48 hours at a temperature of 40° C. and a current density of 150 A/m². A DSA was used for the anode, and a Ti plate was used for the cathode. The analysis results and material balances of the starting electrolytic solution and the indium and electrolytic tailing solution obtained are shown in Table 9.

TABLE 9

Material balance of electrowinning step

| | Amount | Content (%, ppm, g/l, mg/l) | | | | | Distribution (%) | | |
|---|---|---|---|---|---|---|---|---|---|
| | (g, ml) | In | Ni | Cd | Pb | As | In | Ni | Cd |
| Starting electrolytic solution | 2800 | 70.0 | 0.7 | 0.4 | 0.0 | 0.0 | 100.0 | 100.0 | 100.0 |
| Indium | 150 | 99.99994 | 0.3 | 0.0 | 0.2 | 0.0 | 76.5 | 2.3 | 0.0 |
| Electrolytic tailing solution | 2800 | 16.4 | 0.7 | 0.4 | 0.0 | 0.0 | 23.4 | 100.0 | 100.0 |

In Table 9, the amounts in the starting electrolytic solution and the amounts in the electrolytic tailing solution are in ml, the amount of indium is in g, the content of In is in % and g/l, and the contents of components other than In are in ppm and mg/l.

What is claimed is:

1. A method for recovering indium from an indium-containing material, comprising:

a step of adding a substance containing chlorine to an indium-containing solution whose pH has been adjusted to a value in the range of 1 to 2.2 so that the value of the molar ratio of Cl/In is adjusted to a value that is greater than 0 but no greater than 0.68;

a step of adding a reducing agent to the indium-containing solution to which said substance containing chlorine has been added, and depositing an indium sponge by substitution; and a step of extracting indium from said indium sponge in an acid solution.

2. The method for recovering indium from an indium-containing material according to claim 1, wherein one or more substances selected from the group consisting of sodium chloride and an electrolytic tailing solution of indium are used as said substance containing chlorine.

3. The method for recovering indium from an indium-containing material according to claim 1, wherein metallic zinc is used as said reducing agent.

4. The method for recovering indium from an indium-containing material according to claim 2, wherein metallic zinc is used as said reducing agent.

5. The method for recovering indium from an indium-containing material according to claim 1, wherein the acid solution in the step of extracting indium from the indium sponge is a hydrochloric acid solution whose pH is controlled to a value in the range of 0.5 to 1.5, and in which the Eh is controlled to a value in the range of $-400$ to $-500$ mV.

6. The method for recovering indium from an indium-containing material according to claim 1, wherein the indium-containing solution is obtained by blowing a $SO_2$ gas in an indium sulfide under sulfuric acid acidity.

* * * * *